(12) United States Patent
Brusilowicz (10) Patent No.: US 11,043,803 B2
(45) Date of Patent: Jun. 22, 2021

(54) REFERENCE SIGNAL GENERATING METHOD FOR DISTANCE AND DIRECTIONAL PROTECTION ELEMENTS

(71) Applicant: Schweitzer Engineering Laboratories, Inc., Pullman, WA (US)

(72) Inventor: Bartosz Jan Brusilowicz, Wroclaw (PL)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 94 days.

(21) Appl. No.: 16/517,932

(22) Filed: Jul. 22, 2019

(65) Prior Publication Data

US 2021/0028611 A1    Jan. 28, 2021

(51) Int. Cl.
*H02H 7/26* (2006.01)
*H02H 3/08* (2006.01)
*H02H 1/00* (2006.01)

(52) U.S. Cl.
CPC .............. *H02H 7/26* (2013.01); *H02H 3/083* (2013.01); *H02H 1/0007* (2013.01); *H02H 1/0092* (2013.01); *H02H 3/081* (2013.01)

(58) Field of Classification Search
CPC ...... H02H 1/0007; H02H 1/0092; H02H 3/08; H02H 3/081; H02H 3/083; H02H 3/10; H02H 3/105; H02H 3/16; H02H 3/162; H02H 3/165; H02H 3/387; H02H 7/26–30
See application file for complete search history.

(56) References Cited

U.S. PATENT DOCUMENTS

| | | | |
|---|---|---|---|
| 5,208,545 A | 5/1993 | Schweitzer | |
| 5,809,045 A | 9/1998 | Adamiak | |
| 6,311,307 B1 | 10/2001 | Adamiak | |
| 6,417,791 B1 | 7/2002 | Benmouyal | |
| 6,456,947 B1 | 9/2002 | Adamiak | |
| 7,345,862 B2 | 3/2008 | Schweitzer | |
| 7,532,955 B2 | 5/2009 | Dougherty | |
| 9,976,507 B2 | 5/2018 | Ferguson | |
| 10,114,052 B2 | 10/2018 | Kasztenny | |
| 10,879,785 B2 * | 12/2020 | Shuai | H02M 7/5387 |
| 2016/0077149 A1 * | 3/2016 | Schweitzer, III | G01R 31/08 307/131 |
| 2017/0248635 A1 | 8/2017 | Mattoon | |

(Continued)

*Primary Examiner* — Fred E Finch, III
(74) *Attorney, Agent, or Firm* — Bradley W. Schield (57) ABSTRACT

The present disclosure relates to generating reference signals for distance and directional elements in power systems. For example, an intelligent electronic device (IED) may receive A-phase, B-phase, and C-phase electrical measurements of a power system. The IED may transform the A-phase, B-phase, and C-phase measurements to a d-component, a q-component, and a 0-component. The IED may include an adaptive notch filter that reduces or eliminates a double frequency component that may be present when step changes of frequency and/or amplitude occur and/or when the A-phase, B-phase, and C-phase measurements have different amplitudes. By reducing the double frequency component, the IED may generate a more accurate ω which may allow for more accurately tracking changes to the polarizing source. Further, the IED may separately add inertia to the estimated angular frequency used in generating a reference signal.

20 Claims, 6 Drawing Sheets

(56) References Cited

U.S. PATENT DOCUMENTS

| | | | |
|---|---|---|---|
| 2018/0145582 A1* | 5/2018 | Shuai | H02M 7/5387 |
| 2018/0278060 A1* | 9/2018 | Sun | H02J 3/42 |
| 2019/0094291 A1 | 3/2019 | Schweitzer | |
| 2019/0094292 A1 | 3/2019 | Schweitzer | |
| 2019/0334352 A1* | 10/2019 | Sugimoto | H02J 7/00716 |
| 2020/0106261 A1* | 4/2020 | Kasztenny | H02H 1/003 |
| 2020/0287410 A1* | 9/2020 | Zhao | H02J 3/44 |

* cited by examiner

REFERENCE SIGNAL GENERATING METHOD FOR DISTANCE AND DIRECTIONAL PROTECTION ELEMENTS

TECHNICAL FIELD

The present disclosure relates generally to power system monitoring and protection and, more particularly, to generating a reference signal that may be used as a polarizing quantity in protection elements.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electrical power generation and delivery systems are designed to generate, transmit, and distribute electrical energy to loads. These power systems may include equipment, such as electrical generators, electrical motors, power transformers, power transmission and distribution lines, circuit breakers, switches, buses, transmission lines, voltage regulators, capacitor banks, and the like. Such equipment may be monitored, controlled, automated, and/or protected using intelligent electronic devices (IEDs) that receive electric power system information from the equipment, make decisions based on the information, and provide monitoring, control, protection, and/or automation outputs to the equipment.

IEDs may use distance and directional elements in power system protection. For example, IEDs may use a polarizing quantity, such as a positive sequence voltage, in estimating direction and distance to a fault. Memory filters may be added to ensure proper operation of protection elements during faults located close to the relay, when values of voltage amplitudes may be close to zero. Such memory filters may be based on an assumption that phase angles of the positive sequence voltages (V1) change very slowly or will not change due to inertia of synchronous generators.

However, modern power systems may use low-inertia sources that are connected to the power system indirectly, through inverters. In power systems with low-inertia sources, parameters of generated voltages may change by inverter control algorithms without any inertia. Accordingly, there is a need to accurately track changes of the polarizing quantities while adding inertia to prevent step changes of V1 parameters that may cause misoperations of IEDs, such as protection relays.

As explained below, IEDs may accurately estimate angular frequency $\omega$ by tracking power system angular frequency cos and add inertia to changes of estimated V1 parameters. For example, an IED may receive A-phase, B-phase, and C-phase electrical measurements of a power system. The IED may transform the A-phase, B-phase, and C-phase measurements to d-component, q-component, and 0-component signals. The IED may include an adaptive notch filter that reduces or eliminates a double frequency component that may be present when step changes of frequency and amplitude occur and/or when the A-phase, B-phase, and C-phase measurements have different amplitudes. By reducing or eliminating the double frequency component, the IED may generate a more accurate estimated $\omega$ which may allow for more accurately tracking changes to the polarizing source. Further, the IED may separately add inertia to the estimated angular frequency used in generating a reference signal.

Figure 1:
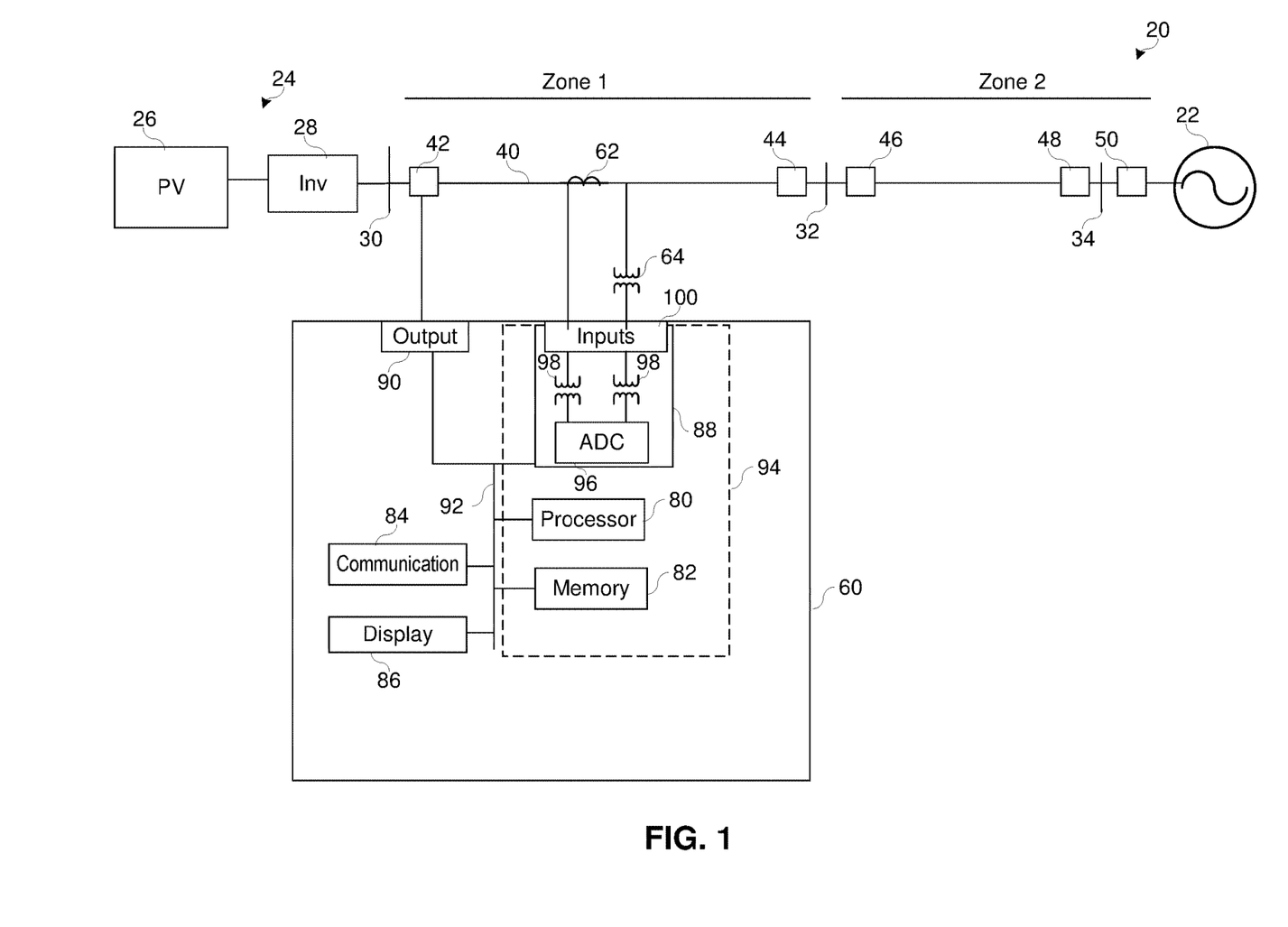
FIG. 1 is a block diagram of an electric power system with an intelligent electronic device (IED) that monitors a power line for events, in accordance with an embodiment.

FIG. 1 illustrates a simplified one-line diagram of an electric power system 20 having a synchronous generator 22 and a low-inertia inverter-based power source 24, such as a photovoltaic array 26 and an inverter 28. The photovoltaic array 26 and the synchronous generator 22 may provide power to loads at buses 30, 32, and 34 via the power line 40. While a simplified one-line diagram is shown, this is meant to be illustrative and the systems and methods described herein may be used in any suitable power system. Further, note that while a single phase of the power line 40 is shown, the transmission system may be, for example, a three-phase transmission system with an A-phase, B-phase, and C-phase.

The electric power system 20 may be monitored, controlled, automated, and/or protected using one or more IEDs 60. In general, IEDs in an electric power generation and delivery system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IED 60) may refer to any microprocessor-based device that monitors, controls, automates, and/or protects monitored equipment within the electric power system 20. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

The IED 60 may monitor electrical parameters of the power line 40. For example, the IED 60 may include a current transformer (CT) 62 that monitors the current of the power line 40 and/or a potential transformer (PT) that monitors the voltage of the power line 40, which may be used in protection operations of the electric power system 20.

The IED 60 may include a processor 80, memory 82, a communication interface 84, a display screen 86, input circuitry 88, and output circuitry 90, which may be communicatively coupled to each other via one or more communication buses 92. The memory 82 may be a non-transitory computer readable medium for storing data and executable instructions. Such programs or instructions executed by the processor 80 may be stored in any suitable article of manufacture that includes one or more tangible, computer-readable media at least collectively storing the instructions or routines described below. In some embodiments, the input circuitry 88, the memory 82 and/or the processor 80 may be implemented as hardware components, such as via discrete electrical components, via a field programmable gate array (FPGA), and/or via one or more application specific integrated circuits (ASICs) and may be referred to generally as processing circuitry 94. Further, the instructions or routines may be provided to the processor 80 to produce a machine, such that the instructions, when executed by the processor 80, implement the operations/acts specified in the flowchart described below with respect to FIG. 2.

The IED 60 may include a display screen 86 that allows a user to view information on the IED 60, such as fault information (e.g., polarizing quantities, fault voltages, fault currents, etc.). In some embodiments, the display screen 86 may be a touchscreen display.

The input circuitry 88 may include a one or more inputs 100, such as input ports and/or pins operably connected to sensors, such as the current transformer(s) 62 and/or the potential transformer(s) 64 to communicate electrical properties of the power line 40 to the IED 60, as described above. For example, the current transformer 62 may provide an analog signal representing (e.g., proportional to) current of the power line 40 via the inputs 100. Further, the potential transformer 64 may provide an analog signal representing (e.g., proportional to) the voltage of the power line 40 to the IED 60 via the inputs 100. The input circuitry 88 may include analog-to-digital converter(s) (ADC) 96 that may provide digitized samples of the current and voltage to the processor 80 to allow for monitoring and protection operations by the processor 80. The input circuitry 88 may include potential transformers 98 that may reduce the voltages received to voltages that may be sampled by the ADC 96. In other embodiments, merging units may provide digital voltage measurements or current measurements. While these are given as examples, note that any suitable inputs may be used in monitoring the power line 40. While the inputs are shown with sensors of a single line for simplicity, in embodiments described below, each phase of a multi-phase system, such as a three-phase system, may be monitored via respective CTs and PTs on each of the phases.

In the illustrated embodiment, the circuit breaker 42 is communicatively coupled to the IED 60 via the output 90. For example, the processor 80 may send a trip signal via the output 90 to open the circuit breaker 42, thereby disconnecting the low-inertia power source 24 and the bus 30 from the remaining electric power system 20.

As mentioned above, the IED 60 may have distance and directional elements in protection of the power line 40 of the electric power system 20. For example, the IED 60 may use a distance that a fault occurred to determine a zone associated with the fault (e.g., zone 1 or zone 2), which may be used in coordinating tripping of the circuit breaker 42. In this example, the IED 60 may respond to a fault (e.g., trip circuit breaker 42) located in zone 1 faster than a fault located in zone 2 to allow for more localized protection in zone 2 to respond. Directional overcurrent protection may use directional elements to supervise the operation of overcurrent elements.

The IED 60 may use a polarizing quantity, such as a polarizing voltage or polarizing current, in the distance and directional elements. As a polarizing voltage, measurements of voltages from unfaulted phases or properly rotated and scaled vectors of positive-sequence voltages may be used. However, a potential misoperation caused by self- and cross-polarizations may occur when a fault is close to a relay and the measured voltage is low (e.g., almost zero). As such, there is a need for accurate and fast tracking of voltage parameters and providing a smooth polarizing signal with proper inertia to reduce or eliminate misoperations.

Figure 2:
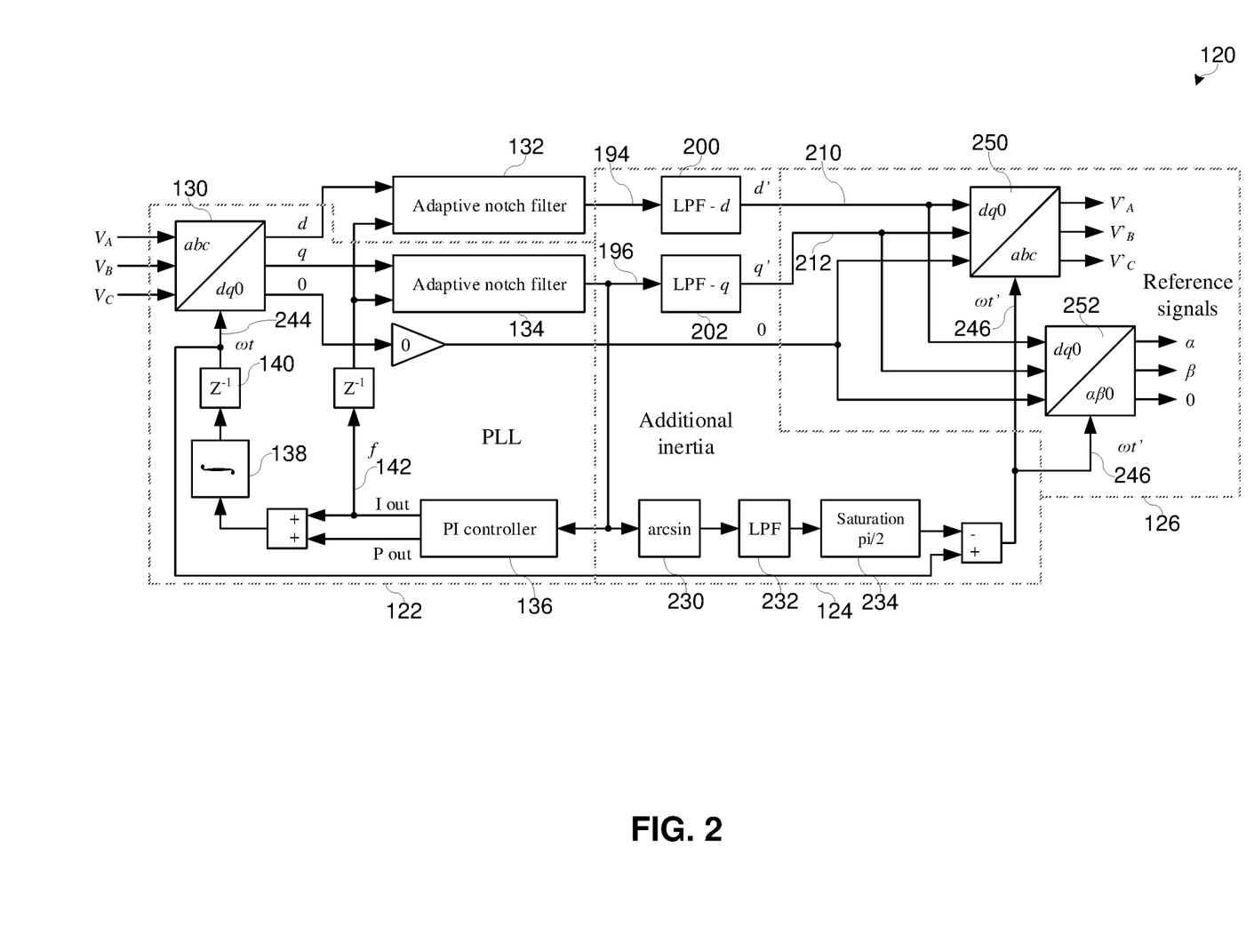
FIG. 2 is a functional block diagram of a process performed by the IED of FIG. 1 to generate a reference signal that is used as a polarizing quantity in monitoring operations of the power line, in accordance with an embodiment.

FIG. 2 is a functional block diagram of a process 120 that may be performed by the IED 60, in accordance with an embodiment. For example, the process 120 may be performed by the processor 80 of the IED 60 executing instructions (e.g., code) stored in memory 82 of the IED 60. As mentioned above, in some embodiments, some or all of the functions may be performed using discrete hardware (e.g., logic circuits, integrated circuits, etc.) of the input circuitry 88 to perform the functional blocks illustrated.

The IED 60 may receive input signals indicating the real parts of voltage measurements $V_A$, $V_B$, and $V_C$ of the A-phase, B-phase, and C-phase of the power system via respective potential transformers 64 on each phase of the power line 40. The process 120 includes a modified synchronous reference frame phase-locked loop (SRF-PLL) 122, part adding additional inertia 124, and block providing reference signals 126. The SRF-PLL 122 includes an abc/dq0 transform 130, an adaptive notch filter 134, a PI controller 136, and an integrator 138. A delay 140, after the integrator 138, is included to avoid an algebraic loop.

At dq0 transform block 130, the A-phase, B-phase, and C-phase voltage measurements may be transformed into dq0 components signals for the voltage measurements of the power line 40. In the SRF-PLL 122, the q-component signal results from Park's transform and is described by equation (1):

$$q = -\frac{2}{3}\sin(\omega t) \cdot V_{Aa}\cos(\omega_S t + \phi_A) - \frac{2}{3}\sin\left(\omega t - \frac{2\pi}{3}\right) \cdot V_{Ba}\cos\left(\omega_S t - \frac{2\pi}{3} + \phi_B\right) - \frac{2}{3}\sin\left(\omega t + \frac{2\pi}{3}\right) \cdot V_{Ca}\cos\left(\omega_S t + \frac{2\pi}{3} + \phi_C\right) \quad \text{Eq. 1}$$

where $V_{xa}$ and $\phi_x$ are the amplitude of voltage and phase angle between measured voltages and Park's transform of A, B, and C phases, $\omega_s$ and $\omega$ are the system and estimated angular frequency respectively, and t is the time at which the measurements were taken. By controlling the estimated angular frequency $\omega$, the control loop attempts to find a stable point where the error signal is zero. At this point, $\omega$ and $\omega_s$ are equal and phase differences $\phi$ are zero.

In some SRF-PLLs, the q-component signal may be provided directly to the PI controller, which may be sufficient for symmetrical and balanced input signals. Such may be the case for inverters, motor control, etc. However, protection elements on IEDs 60, such as relays, may receive asymmetrical and/or unbalanced input signals during abnormal conditions, such as during fault conditions. If the SRF-PLL is synchronized with the system such that $\omega_s=\omega$, equation (1) may be transformed to equation (2) using trigonometric properties. The signal q may be divided into a static DC component ($q_{DC}$) and an oscillating AC component ($q_{AC}$) that oscillates with a double system angular frequency $2\omega$.

$$q = q_{DC} + q_{AC} = \frac{1}{3}(V_{Aa}\sin(\phi_A) + V_{Ba}\sin(\phi_B) + V_{Ca}\sin(\phi_A)) + \quad \text{Eq. 2}$$

$$-\frac{1}{3}\left(V_{Aa}\sin(2\omega t + \phi_A) + V_{Ba}\sin\left(2\omega t + \frac{2\pi}{3} + \phi_B\right) + V_{Ca}\sin\left(2\omega t - \frac{2\pi}{3} + \phi_C\right)\right)$$

In a stable state, synchronization with balanced symmetrical voltages $V_A$, $V_B$, and $V_C$, the value of q may be zero. During transient states, caused by changes of parameters of phase voltages, the value of q may vary. Influence of changes of voltage parameters on q may be estimated using equation (2). Rapid change of phase $\phi$, by the same value in three phases, cause transient increases in $q_{DC}$ and $q_{AC}$. Increased $q_{DC}$ starts operation of the control loop and ensures re-synchronization ($q_{DC}=q_{AC}=0$). Change of the amplitude in any of the three-phases, asymmetry, causes an oscillating component $q_{AC}$ appearance.

As illustrated in FIG. 2, a notch filter, such as the adaptive notch filter 134, may be included to compensate for the $q_{AC}$ component. Notch filters may provide steeper characteristics, smaller delays, and larger attenuation of selected frequency over low pass filters, which may be desirable in power system protection. Further, in power systems with inverter-based resources, the frequency may change rapidly and have values different from nominal. The adaptive notch filter 134 may receive an adaptation signal 142 from the PI controller 136 that may be used to provide an adjusted q-component signal to the PI controller 136 corresponding to the frequency. The adaptive notch filter 134 may be embodied as an infinite impulse response (IIR) IIR Butterworth $2^{nd}$ order low pass filter (LPF) using transformation equation (3).

$$s \rightarrow B\frac{z^2 - 1}{z^2 - 2Az + 1} \quad \text{where} \quad \text{Eq. 3}$$

$$A = \frac{\cos(2\pi \cdot 2 \cdot f_i \cdot t_s)}{\cos(\pi \cdot bnd \cdot t_s)}; B = \tan(\pi \cdot bnd \cdot t_s)$$

where $f_i$ is the input frequency from the integral component of the PI controller 136 (e.g., adaptation signal 142), $t_s$ is the sampling period, bnd is the width of the stopband. That is, the adaptive notch filters 132 and 134 may adjust filter coefficients of the d-component and q-component signals based on the adaptation signal 142, output form the integral component of PI controller 136, corresponding to the system frequency to allow the adaptive notch filters 132 and 134 to reduce the AC components in the d and q signals. Discrete transfer function of the adaptive notch filter 134 for $f_i$=60 Hz and bnd=40 Hz is described according to equation (4):

$$G(z) = \frac{z^4 - 4Az^3 + (2 + 4A^2)z^2 - 4Az + 1}{1.02z^4 - 4.04Az^3 + (2 + 4A^2)z^2 - 3.96Az + 0.98} \quad \text{Eq. 4}$$

In the illustrated embodiment, the modified SRF-PLL 122 is shown as being separated from the inclusion of the additional inertia to ensure accurate operation of the SRF-PLL 122 and to allow for modification of the additional inertia without affecting the remaining portions of the algorithm.

Figure 3:
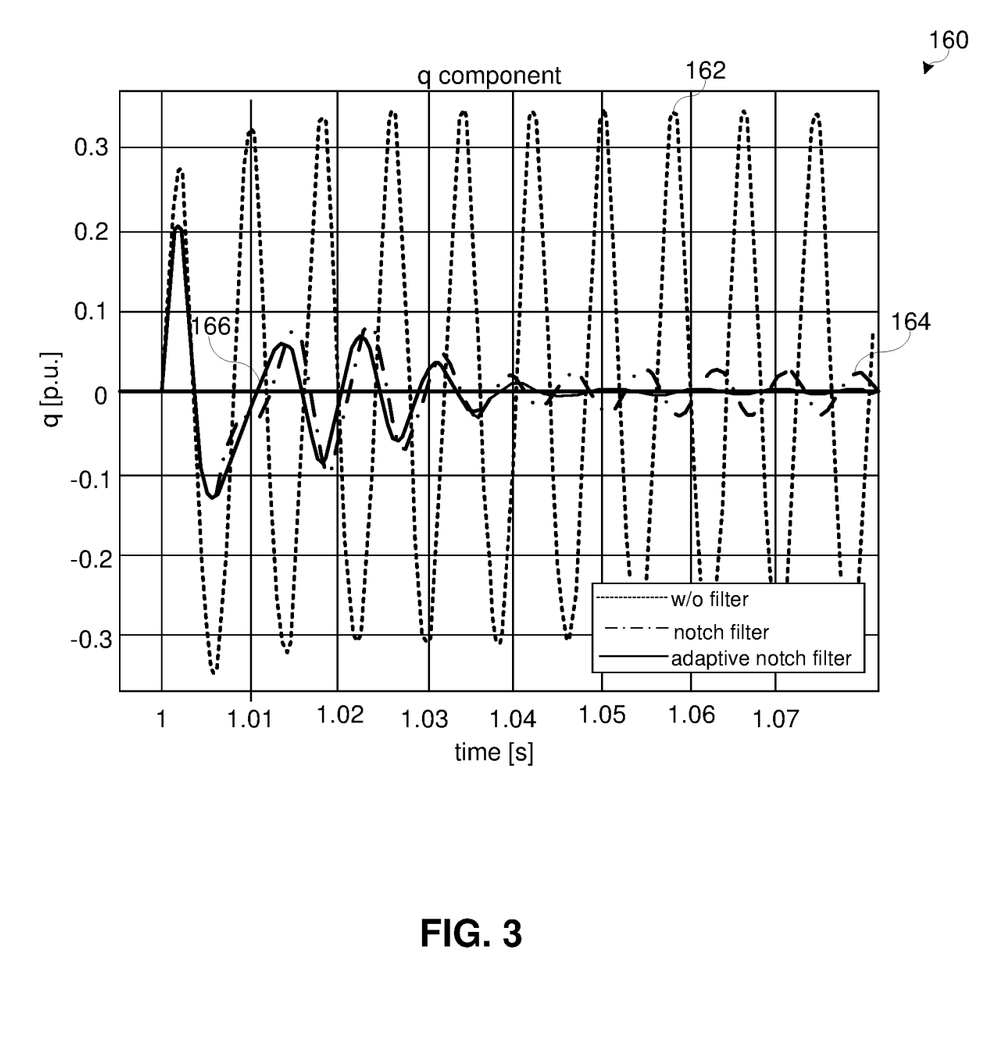
FIG. 3 is a plot of q components (output from an adaptive notch filter) used in the process of FIG. 2, in accordance with an embodiment.
Figure 4:
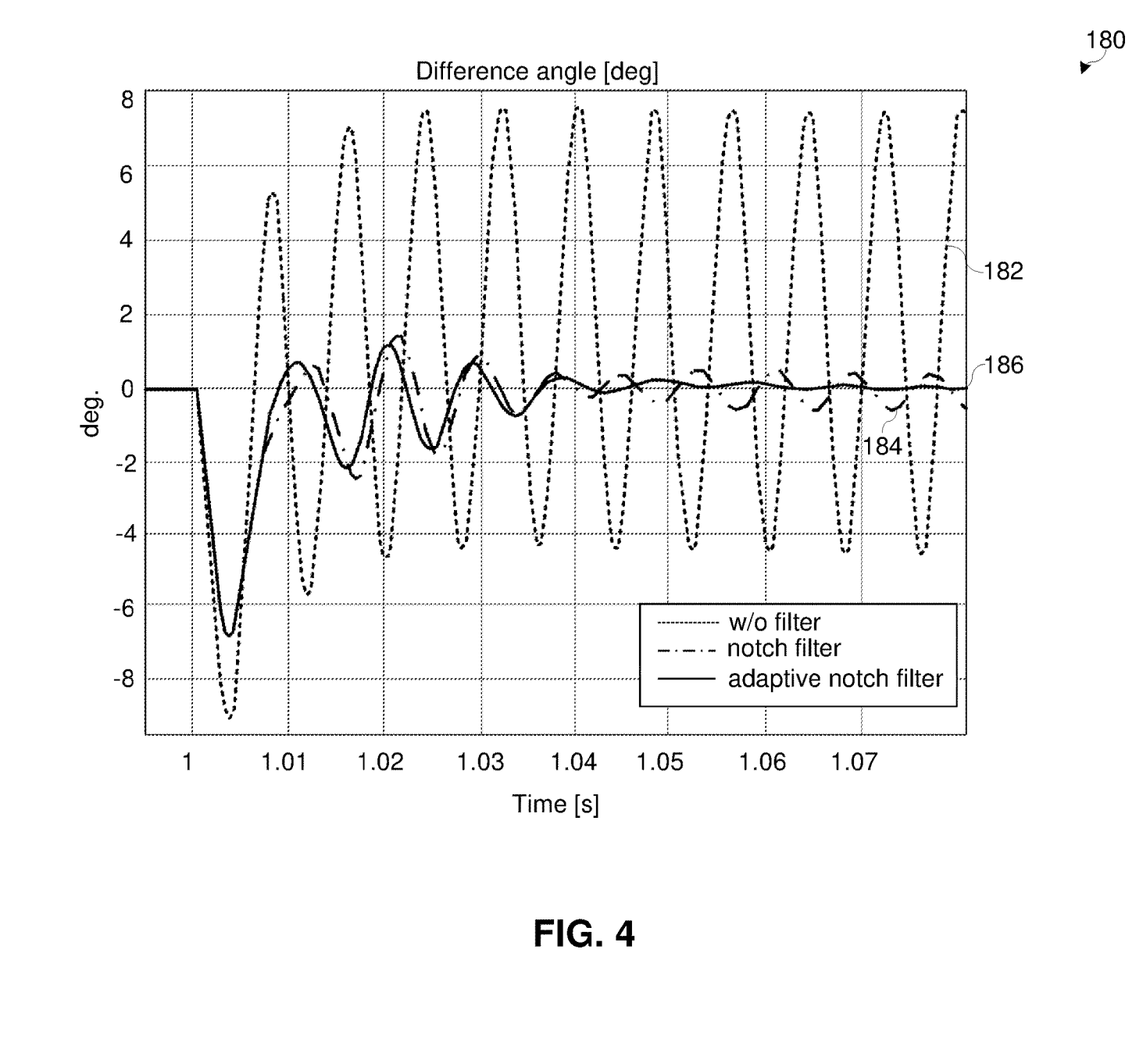
FIG. 4 is a plot of difference angles from the process of FIG. 2, in accordance with an embodiment.

FIG. 3 illustrates a plot 160 of the q-component signal for step changes in A-phase amplitude for a 62 Hz signal from an SRF-PLL without a notch filter (signal 162), with a notch filter (signal 164), and with an adaptive notch filter (signal 166). FIG. 4 shows a plot 180 of signals 182, 184, and 186 of the difference angles between the estimated $\omega$ and the actual system $\omega_s$ for the step change of FIG. 3. As shown in FIG. 3, a step change in the A-phase amplitude causes the signal 162 without the filter to include a $q_{AC}$ component oscillating with a double angular frequency $2\omega$, which causes an oscillation error of $\omega$ estimation in signal 182.

As illustrated, systems that use a notch filter prior to the PI controller may have a filtered q-component signal 164 with relatively reduced oscillations compared to the signal 162, which result in a more accurate estimated $\omega$ signal 184. Further, systems that use an adaptive notch filter 134 may further reduce q-component signal oscillations by using the estimation of frequency $f_i$ in equation (3). As the integral component I corresponds to frequency estimation, the PI controller 136 may provide I as feedback for an indication of $f_i$ in equation (3) via the adaptation signal 142. The plot 160 includes the signal 166 of the q-component signal output by the adaptive notch filter 134, which may result in a difference angle with smaller differences between the estimated $\omega$ and the actual system $\omega_s$, as indicated by the signal 186. The integral and proportional signals may be integrated 138 and delayed, at delay 140, to obtain a more reliable estimate of $\omega t$. The estimated $\omega t$ may then be used as a feedback signal, from the delay 140, as an input to the abc/dq0 transform 130 to allow for close the control loop and more accurate subsequent estimations of $\omega t$. Further, the estimated wt may be separately provided from delay 140 to be used in part adding additional inertia.

Additional inertia may be added separately to the d and q components and the $\omega$ estimation. When the SRF-PLL 122 is synchronized with the power system angular frequency $\omega_s$, and voltages of the three phases are balanced, the d and q components may have DC components without an AC component, according to equations (2) and (5). Equation (5) was obtained using Park's transform and similar simplifications as equation (2).

$$d = d_{DC} + d_{AC} = \frac{1}{3}(V_{Aa}\cos(\phi_A) + V_{Ba}\cos(\phi_B) + V_{Ca}\cos(\phi_A)) + \quad \text{Eq. 5}$$

$$\frac{1}{3}\left(V_{Aa}\cos(2\omega t + \phi_A) + \right.$$

-continued
$$V_{Ba}\cos\left(2\omega t + \frac{2\pi}{3} + \phi_B\right) + + V_{Ca}\cos\left(2\omega t - \frac{2\pi}{3} + \phi_C\right)\Big)$$

Where $d_{DC}$ is the DC component of the d signal, $d_{AC}$ is the AC component of the d signal, and the remaining variables are described above with respect to equation (1). During unbalanced conditions and transient states, d and q may have also AC components.

In the illustrated embodiment, the $d_{AC}$ component may be reduced or eliminated by the adaptive notch filter 132. However, transient oscillations of d and q outputs from the adaptive notch filters may be caused by step changes of angle φ.

Figure 5:
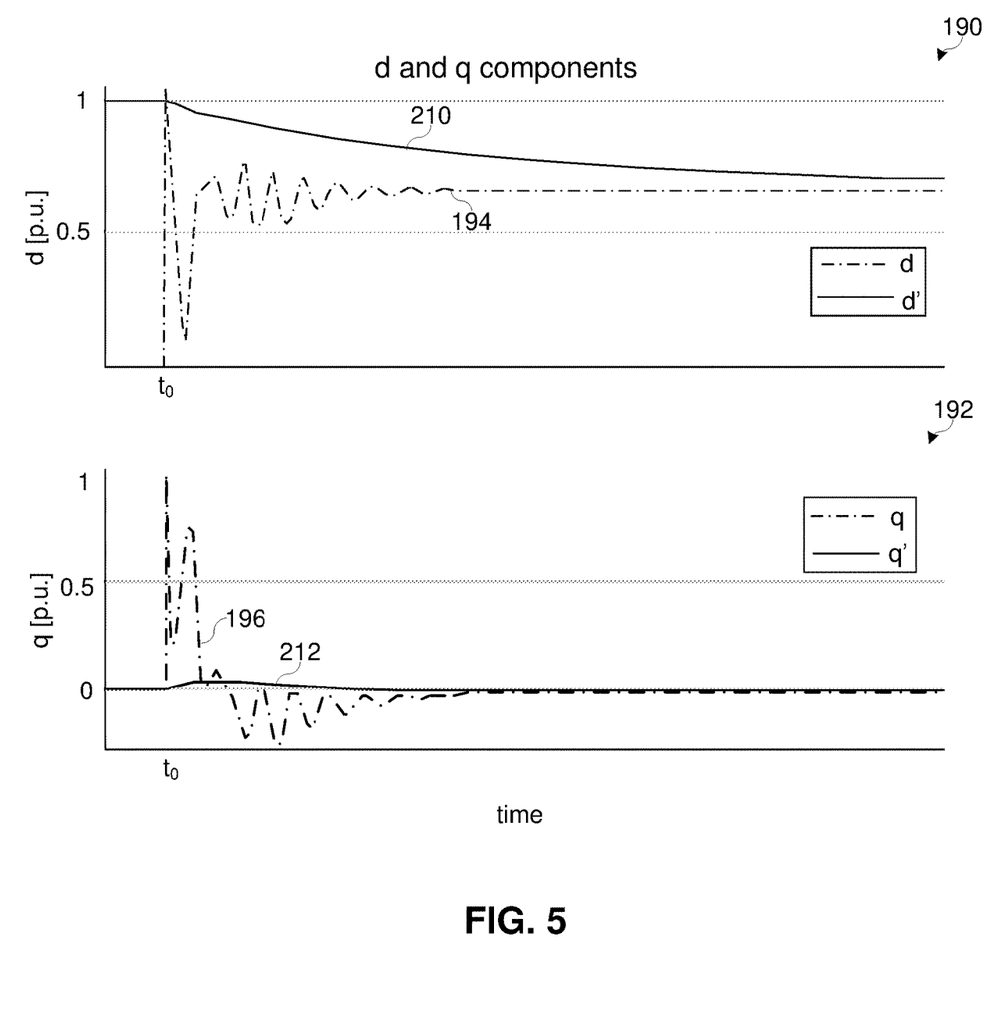
FIG. 5 is plot of d and q components before and after a low pass filters (LPFs) used in adding inertia to the reference signal, in accordance with an embodiment.

FIG. 5 illustrates a plot of d-component and q-component signals before and after the low-pass filters (LPFs) 200 and 202 of FIG. 2 for a step change of A-phase amplitude from 1 to 0 and a step change of angle $\phi_A$, $\phi_B$, and $\phi_C$ of 90 degrees. Referring back to FIG. 2, the adaptive notch filters 132 and 134 may output d and q signals 194 and 196 that include transient oscillations due to step changes in amplitude and/or angle.

To reduce or eliminate the transient oscillations and add inertia to d and q estimations, the additional inertia block may include IIR LPFs 200 and 202 that receive the d signal 194 and the q signal 196 and provide a filtered d-component signal (d') 210 and a filtered q-component signal (q') 212. For example, the IIR LPFs 200 and 202 may be described with equation (6):

$$G_{LPF}(z) = \frac{1-C}{z-C}; C = \exp(-t_S/T_{del})$$ Eq. 6 where $t_s$ is the sampling period and $T_{del}$ is the time delay.

The SRF-PLL 122 tracks system angular frequency accurately with small inertia due to the PI controller 136. To add inertia to the ω estimation, settings of the PI controller 136 may be changed, however, this may affect operation of the SRF-PLL 122. Therefore, inertia to the estimated ω may be added separately using an arcsin function 230, a low-pass filter LPF 232, and a saturation function 234 in the additional inertia block 124. If the double frequency part $q_{AC}$ in equation (2) is reduced or removed by the adaptive notch filter 134 and the voltages are symmetrical, the angle difference between the system angular frequency $\omega_s$ and the estimated angular frequency ω can be described by equation (7).

$$\phi = \arcsin\left(\frac{3 \cdot q}{V_A + V_B + V_C}\right)$$ Eq. 7 where $V_A$, $V_B$, and $V_C$ are the amplitudes of voltages of the A-phase, B-phase, and C-phase, and q is the q-component from the dq0 transform. Due to fast operation of the SRF-PLL 122, the estimation of φ using equation (7) may have an accurate value for a short time and then it may rapidly change, due to change of q-component 196 of FIG. 5. Therefore, to keep the accurate q value and remove oscillations, the low-pass filter LPF 232 with a properly set time delay and gain may be used. Further, a saturation block to π/2 may be used to ensure limiting the added delay from the LPF 232 to 90 degrees.

Figure 6:
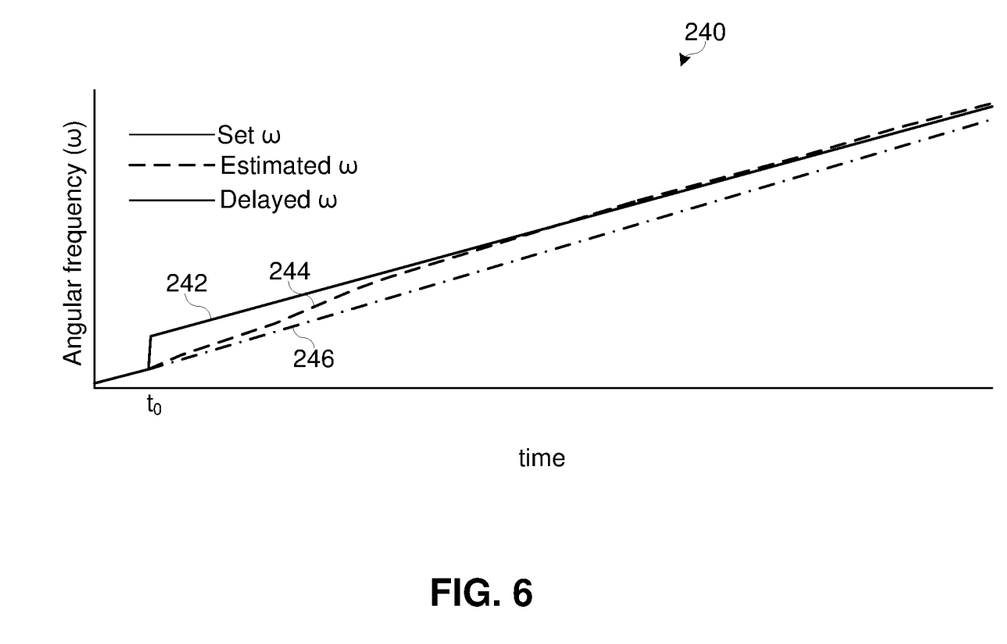
FIG. 6 is a plot of estimated (output from a delay after an integrator) and delayed (with added delay from a saturation function) angular frequency tracking a set change to angular frequency, in accordance with an embodiment.

FIG. 6 is a plot of the set system ω 242, ω 244 estimated by SRF-PLL 122, and delayed ω' 246 for a step change of angle φ by 90 degrees. As illustrated, at time $t_0$, the set system ω 242 has a step change of angle φ by 90 degrees. The estimated ω without a delay may adjust to the step change as shown. The delayed estimated ω' 246 may be more resistant to change due to the additional inertia from the delay. That is, by adding delay to the estimated ω, the delayed estimated ω' may respond slower to the step change to represent inertia of generators.

By including inertia in the estimated ω separately, changes to inertia may be changed according to the application, for example, via user input of the IED 60. Further, by adding inertia separately, the inertia added to ω does not deteriorate operation of the SRF-PLL 122 that tracks system $\omega_s$. Inertia in delayed ω' may be present during transients cause by changes of input voltage signal parameters, and may have values reflecting the size and sign of changes.

Referring to FIG. 2, reference signals, such as V'$_A$, V'$_B$, and V'$_C$ and/or α, β, and 0, may be created using estimation of the d'-component 210 and q'-component signals 212 and the estimated delayed angular frequency ω' 246. In the illustrated embodiment, the 0-component from the abc/dq0 transform 130 is provided to transforms 250 and 252. While two transforms used to generate reference signals are illustrated, note that one, two, or more reference signals may be used. Estimations of d' and q' are delayed DC components— double frequency parts are eliminated using the adaptive notch filters 132 and 134. For stable conditions, synchronization of the PLL (e.g., q=0), the d component reflects magnitude of positive sequence symmetrical component vector $V_1$ of input voltages. In such a case, α and β components from the dq0/αβ0 transform 252 correspond to real and imaginary parts of $V_1$. Additionally, using the dq0/abc transform 250, smooth three phase voltage V'$_A$, V'$_B$, and V'$_C$ reference signals, with amplitude equal to V1, can be generated. Using the process 120, real and imaginary parts of $V_1$ that corresponds to balanced and symmetrical voltages, for unbalanced and unsymmetrical input voltages, can be created.

As mentioned above, the reference signals from the transforms 250 and 252 may be used in distance and direction elements in IEDs, such as protective relays. For example, the IED 60 may determine a positive sequence voltage from the reference signals to be used as a polarizing voltage. By using a polarizing voltage that more accurately tracks the estimated angular frequency and that includes additional inertia, distance and direction elements of the IED may be more reliable during asymmetric or transient conditions on the power system.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f).

However, for any claims containing elements designated in any other manner, it is intended that such elements are not to be interpreted under 35 U.S.C. 112(f).

What is claimed is:

1. An intelligent electronic device (IED), comprising:
one or more inputs configured to receive at least an A-phase measurement, a B-phase measurement, and a C-phase measurement of an electric power system; and
processing circuitry configured to:
transform, via an abc/dq0 transform, the A-phase measurement, the B-phase measurement, and the C-phase measurement into at least a d-component signal and a q-component signal;
determine an estimated angular frequency, based at least in part on the q-component signal, to be used by the abc/dq0 transform;
add additional inertia to the estimated angular frequency separately from determining the estimated angular frequency; and
provide one or more reference signals based on the estimated angular frequency with the additional inertia added;
detect a fault in the electric power system using the one or more reference signals; and
perform an operation upon detecting the fault.

2. The IED of claim 1, wherein the processing circuitry comprises:
a proportional-integral (PI) controller configured to provide an integral signal and a proportional signal; and
a notch filter, between the PI controller and the abc/dq0 transform, configured to receive the q-component signal and to provide a filtered q-component signal that reduces an oscillating component of the q signal that occurs during asymmetry in the A-phase measurement, the B-phase measurement, the C-phase measurement, or any combination thereof.

3. The IED of claim 2, wherein the notch filter comprises a first adaptive notch filter configured to receive the integral signal, corresponding to estimated system frequency, and to adapt coefficients used in filtering the q-component signal based on the frequency.

4. The IED of claim 3, wherein the processing circuitry comprises a second adaptive notch filter configured to receive the integral signal, corresponding to estimated system frequency, and to adapt coefficients used in filtering the d-component signal based on the frequency.

5. The IED of claim 4, wherein the processing circuitry comprises a second low pass filter configured to reduce transient oscillations of the filtered d-component signal provided by the second adaptive notch filter.

6. The IED of claim 3, wherein the processing circuitry comprises a first low pass filter configured to reduce transient oscillations of the filtered q-component signal provided by the first adaptive notch filter.

7. The IED of claim 1, wherein the processing circuitry is configured to add inertia to the estimated angular frequency using an arcsin function, a low pass filter, and a saturation block.

8. The IED of claim 7, wherein the saturation block limits delay caused by the low pass filter.

9. A method, comprising:
receiving an A-phase measurement, a B-phase measurement, and a C-phase measurement of an electrical power system;
transforming the A-phase measurement, the B-phase measurement, and the C-phase measurement to at least a d-component and a q-component;
determining an estimated angular frequency based at least in part on the q-component;
adding additional inertia to the estimated angular frequency separately from determining the estimated angular frequency;
providing a reference signal based on the estimated angular frequency with the additional inertia added; and
performing a protection operation on the electrical power system based at least in part on the reference signal.

10. The method of claim 9, comprising determining, via an adaptive notch filter, the estimated angular frequency using the q-component and an adaptation signal corresponding to the system frequency.

11. The method of claim 10, comprising determining, via a proportional-integral (PI) controller, a proportional output signal and an integral output signal, wherein the integral signal is used as the adaptation signal corresponding to the system frequency.

12. The method of claim 11, wherein the PI controller combines the proportional output signal and the integral output signal into a combined signal, integrates the combined signal, and delays the integrated combined signal to determine the estimated angular frequency.

13. The method of claim 9, comprising filtering the d-component and the q-component with respective adaptive notch filters and respective low-pass filters.

14. The method of claim 9, comprising:
determining an arcsin signal of the q-component;
delaying and filtering the arcsin signal using a low pass filter (LPF) to obtain a filtered signal;
limiting delay of the filtered signal; and
adding the filtered signal with the limited delay to the estimated angular frequency as the additional inertia.

15. A system, comprising:
an input configured to receive at least an A-phase measurement, a B-phase measurement, and a C-phase measurement of an electric power system;
memory; and
a processor operatively coupled to the memory, wherein the processor is configured to execute instructions stored in the memory to cause the processor to:
transform the A-phase measurement, the B-phase measurement, and the C-phase measurement into at least a d-component and a q-component;
determine an estimated angular frequency based at least in part on the q-component;
add additional inertia to the estimated angular frequency separately from determining the estimated angular frequency; and
provide a reference signal based on the estimated angular frequency with the additional inertia added;
detect a fault in the electric power system based at least in part on the reference signal; and
determine a fault distance, fault direction, or both, upon detecting the fault.

16. The system of claim 15, wherein the processor is configured to determine the estimated angular frequency using a synchronous reference frame phase-locked loop.

17. The system of claim 15, wherein the processor is configured to filter the q-component via an adaptive notch filter, wherein the adaptive notch filter is adapted based on an adaptation signal corresponding to system frequency.

18. The system of claim 15, wherein the processor is configured to:
determine positive sequence voltage based on the reference signal;

determine the fault distance, the fault direction, or both, using the positive sequence voltage.

19. The system of claim 18, wherein the processor is configured to send a signal to a circuit breaker to open the circuit breaker upon detection of the fault.

20. The system of claim 15, wherein the processor is configured to transform, using the estimated angular frequency, the d-component, the q-component, and a 0-component signal to a reference signal comprising an A-phase voltage, a B-phase voltage, and a C-phase voltage.

* * * * *